United States Patent [19]

Boss et al.

[11] 4,362,017
[45] Dec. 7, 1982

[54] HYDRAULIC TORQUE CONVERTER

[75] Inventors: Franz Boss, Kressbronn; Gerold Bieber, Langenargen; Karlheinz Schachmann, Friedrichshafen, all of Fed. Rep. of Germany

[73] Assignee: Zahnradfabrik Friedrichshafen AG, Friedrichshafen, Fed. Rep. of Germany

[21] Appl. No.: 128,081

[22] Filed: Mar. 7, 1980

[30] Foreign Application Priority Data

Mar. 14, 1979 [DE] Fed. Rep. of Germany ....... 2909968

[51] Int. Cl.³ .............................................. F16H 41/30
[52] U.S. Cl. ...................................... 60/337; 60/330; 60/361
[58] Field of Search ................. 60/337, 339, 358, 367, 60/362, 329, 330, 345, 361

[56] References Cited

U.S. PATENT DOCUMENTS

| | | | |
|---|---|---|---|
| 2,679,728 | 6/1954 | Trail | 60/337 |
| 2,818,708 | 1/1958 | Kelley | 60/337 |
| 2,994,197 | 8/1961 | Mamo | 60/362 X |
| 3,125,857 | 3/1964 | Schneider | 60/361 |
| 3,507,118 | 4/1970 | Yamaguchi et al. | 60/345 |
| 3,724,209 | 4/1973 | Fackenthal | 60/357 |
| 3,785,155 | 1/1974 | Upton | 60/352 X |
| 3,841,094 | 10/1974 | Cobb | 60/363 X |

*Primary Examiner*—Gerald A. Michalsky
*Attorney, Agent, or Firm*—Karl F. Ross

[57] ABSTRACT

A hydraulic torque converter with a toroidal space bounded by a pump member, a turbine member and a free-wheeling stator has an inlet channel for fresh transmission fluid (oil) which opens into the pump torus at a location spaced from the pump member, preferably via the stator, whereby the relatively cool volume of newly admitted fluid mingles with the fluid already present instead of being immediately centrifugated toward the peripheries of the pump and turbine members from which it would quickly return to the sump. The inlet channel may include one or more radial passages in a spacer ring separating the stationary races of the journal bearings by which the pump member and the stator are supported on a trunnion rigid with the converter housing.

3 Claims, 4 Drawing Figures

HYDRAULIC TORQUE CONVERTER

FIELD OF THE INVENTION

Our present invention relates to a hydraulic torque converter as used, for example, in an automotive transmission.

BACKGROUND OF THE INVENTION

Torque converters generally comprise an externally powered driving member, known as a pump, and a driven member, known as a turbine, each having the shape of a torus. The two members are coaxially mounted in a housing for independent rotation and have blade-supporting peripheral walls jointly defining a toroidal space filled with transmission fluid hereinafter referred to as oil. This toroidal space is also bounded, along a peripheral zone closest to the axis of rotation, by blade-supporting walls of a so-called stator which, however, generally is not stationary but is free-wheeling in the housing to serve as a return guide for the oil circulating within that space between the blades of all three members. In the system here contemplated, some of the oil is continuously drained off to a sump and, after cooling in an external circuit, is returned to the converter by a supply pump. Certain converters operating according to this principle are known under the designation Trilok.

Conventionally, the fresh oil is admitted into the toroidal converter space through an inlet which terminates in a channel passing through the hub of the pump member and opens into the torus thereof while the spent oil is removed from the torus of the turbine member through an outlet partly passing through the hub of the latter. Though this arrangement has certain structural conveniences, it sets the relatively cold incoming oil in immediate rotation at substantially the speed of the pump member and centrifugates it, on account of its greater specific gravity, toward the periphery of the toroidal converter space whence most of it promptly flows to the outlet and thus to the sump. The externally cooled oil, therefore, mingles only to a minor extent with the hotter oil circulating in the converter space whereby the heat generated in the converter, which may be particularly intense with repeated starts and stops of a vehicle using same, is dissipated only at a slow rate. It thus often becomes necessary, in order to prevent overheating, to use outsize supply pumps and coolers for the recirculation of a sufficient amount of oil.

OBJECT OF THE INVENTION

The object of our present invention, therefore, is to provide means in such a converter for improving the cooling effect of the externally recirculated oil, thereby allowing a reduction in the sizes of the supply pump and the cooler included in the external circuit.

SUMMARY OF THE INVENTION

In accordance with our present improvement, the inlet for fresh oil coming from the supply pump no longer passes through the hub of the pump member but terminates in a channel which opens into a toroidal converter space at a location spaced from that member.

Advantageously, the channel for the incoming oil passes through the body of the stator which is generally the slowest-moving member of the converter. In principle, however, we could also let the incoming oil enter the converter space through the turbine member which at times of large heat generation rotates considerably more slowly than the pump member.

The greater thermal efficiency realized with our invention, aside from enabling the use of smaller supply pumps and oil coolers, may also allow a reduction in the overall dimensions of the converter itself since less consideration need be given to the ability of its pump and turbine members to dissipate some of the heat by radiation to the outside. This, in turn, enables greater compactness of the entire transmission whose mechanical parts generally have a diameter substantially less than that of the converter. With less oil subjected to forced recirculation by an external supply pump, the system operates at higher overall efficiency.

BRIEF DESCRIPTION OF THE DRAWING

Our invention will now be described in detail with reference to the accompanying drawing in which.

SPECIFIC DESCRIPTION

Figure 1:
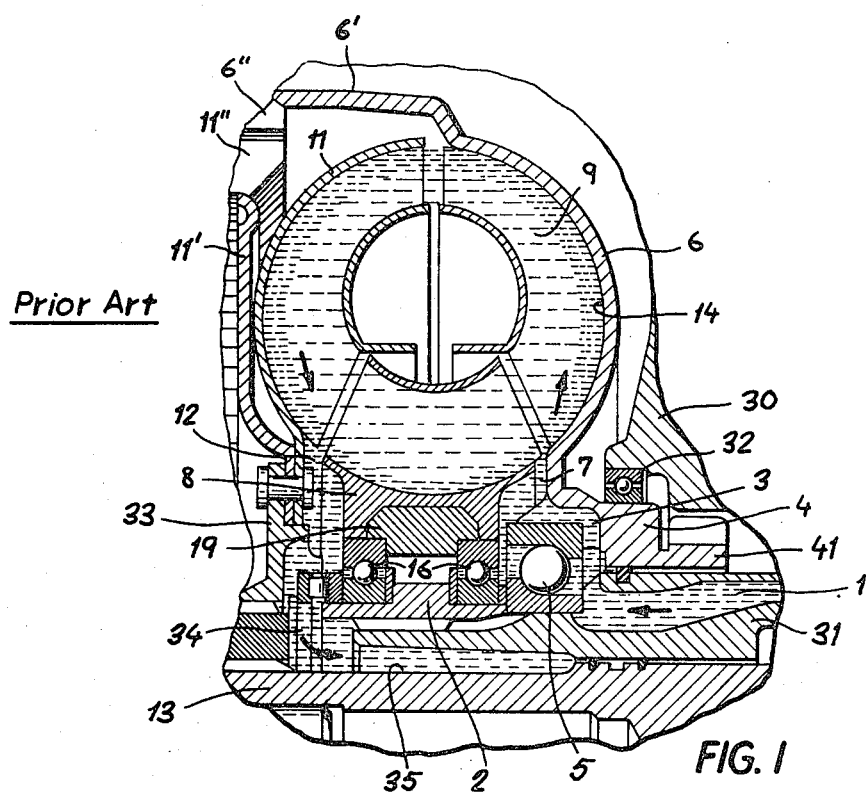
FIG. 1 is a cross-sectional view of the upper half of a conventional hydraulic torque converter to which our invention is applicable.

In FIG. 1 we have shown a conventional Trilok-type converter with a housing 30 forming a stationary trunnion 31 in which an output shaft 13 is rotatably journaled. Trunnion 31 supports, via a ball bearing 5, a hub 4 of a pump member 6 to which rotation is imparted via a pinion 41 forming part of an otherwise nonillustrated gear train powered by the engine of an automotive vehicle. Hub 4 is further braced against housing 30 by a counterbearing 32.

A stationary sleeve 2 splined onto trunnion 31 supports, via ball bearings 16, a hub 19 of a stator 8 lying between pump member 6 and a turbine member 11. The latter has a hub 33 by which it is mounted on output shaft 13 and which is separated by a gap 12 from the body of stator 8. An inlet 1 in trunnion 31 serves for the admission of fresh, cool oil from an external supply pump, not shown, this inlet communicating with radial passages 3 in hub 4 through which the incoming oil enters a gap 7 between stator 8 and pump member 6. The incoming oil, already set in rotation at substantially the speed of pump member 6 upon flowing through passages 3, hardly mixes with the oil circulating in a toroidal space 9 defined by members 6, 8 and 11 but is centrifugally accelerated, owing to its higher specific gravity, along the peripheral surface 14 of pump member 6 and continues between the blades thereof until it reaches the blades of turbine member 11 in the other half of space 9. Hugging the peripheral wall of the turbine member, most of this cooler oil then enters the gap 12 and exits from the converter via a passage 34 in turbine hub 33 from which an annular clearance 35 between shaft 13 and trunnion 31 leads to a nonillustrated sump. FIG. 1 also shows extensions 6' and 11' of pump and turbine members 6 and 11 carrying cooling fins 6" and 11".

Figure 2:
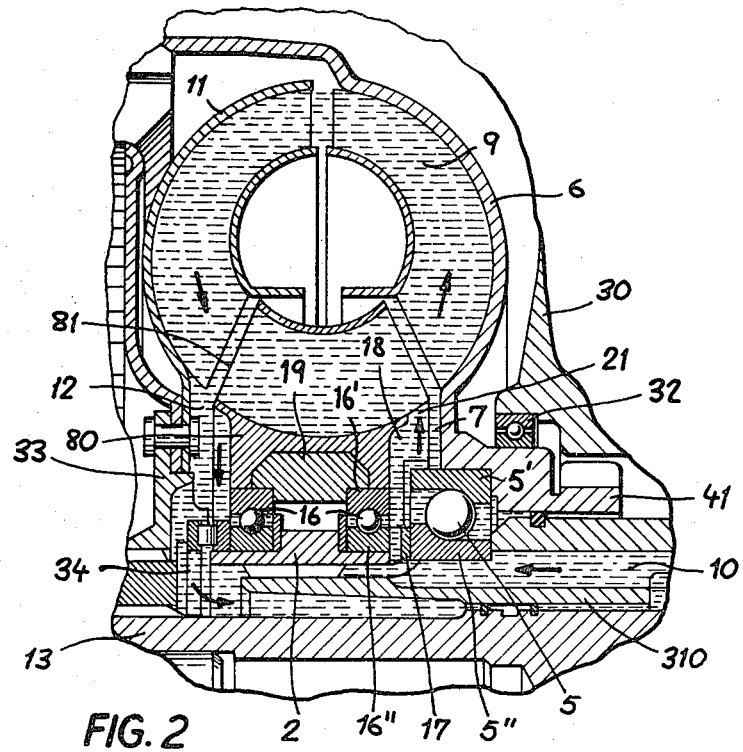
FIG. 2 is a view similar to FIG. 1 but illustrating our present improvement.

In FIG. 2 (see also FIGS. 3 and 4) we have illustrated an improved converter according to our present invention whose housing 30, pump number 6, turbine member 11 and output shaft 13 are substantially identical with those of FIG. 1. The pump member 6 is here provided with a hub 40 resting solidly against the outer race 5' of bearing 5 while lacking the passages 3 of the hub 4 shown in FIG. 1. A trunnion 310, rigid with housing 30, has an extended inlet 10 which passes inside the inner race 5" of bearing 5 and terminates at a spacer ring 17 inserted between this race 5" and the corresponding inner race 16" of the adjoining stator bearing 16 whose outer race 16' is separated from outer race 5' by an annular space 15 forming an extension of gap 7. Ring 17 has at least one radial passage through which the incoming oil enters the space 15 as more clearly shown in FIGS. 3 and 4. The body of a stator 80, mounted on hub 19 and carrying blades 81, is formed with one or more radial channels 18 terminating in one or more nozzles 21 through which the incoming oil is admitted into the gap 7 between pump member 6 and stator 80 at locations just ahead of blades 81.

Since the oil entering the toroidal converter space 9 is subjected to little or no peripheral acceleration, it readily mixes with the fluid already circulating in that space and effectively cools it. The outgoing flow by way of gap 12 and channel 34, accordingly, consists to a significant extent of oil which has circulated for a considerable time in space 9 and has therefore a substantially higher temperature than the incoming oil.

Figure 3:
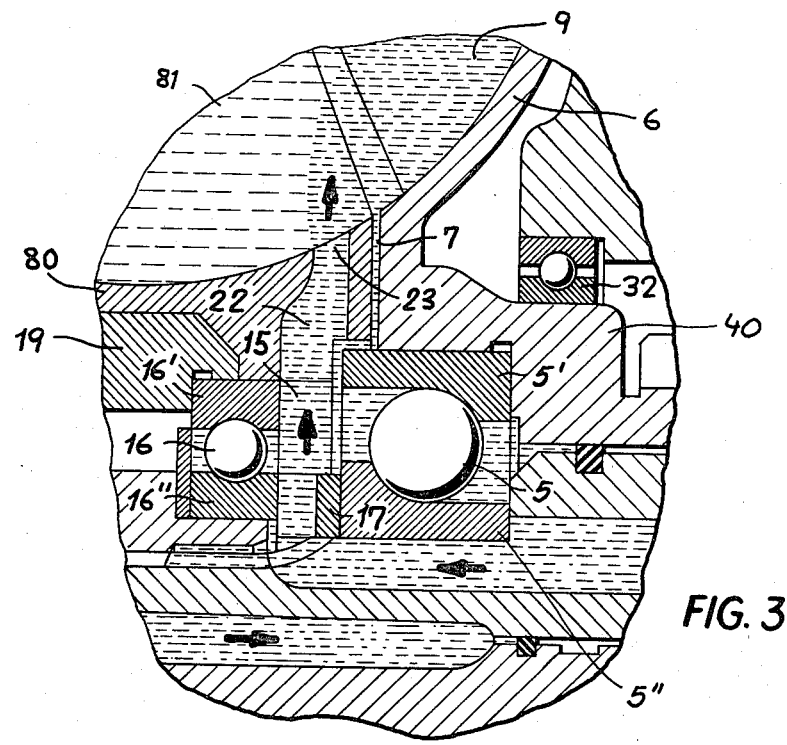
FIGS. 3 and 4 are two fragmentary sectional views drawn to a larger scale and showing certain modifications of the embodiment illustrated in FIG. 2.
Figure 4:
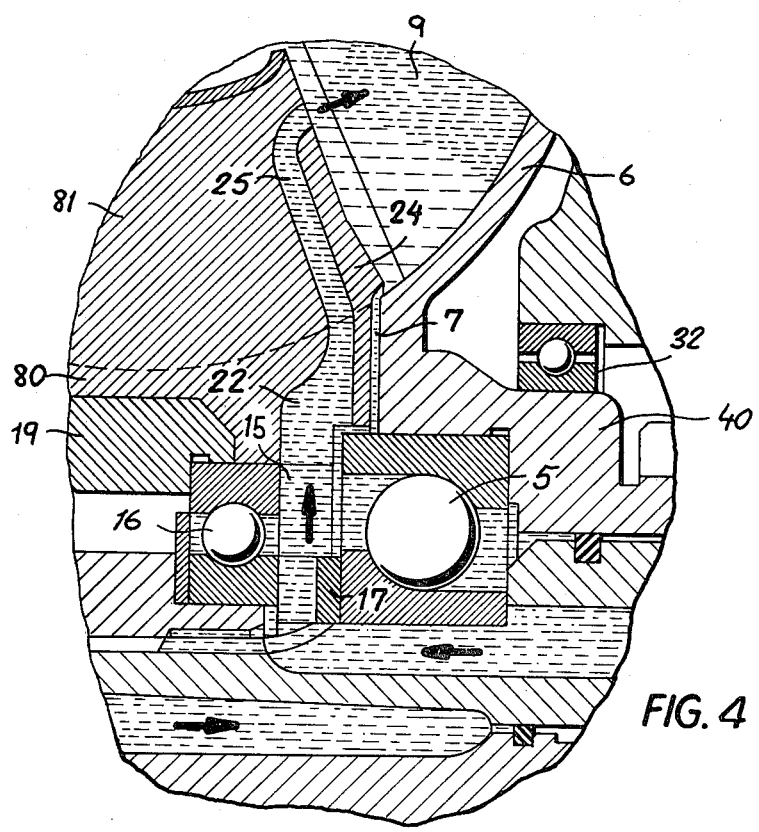

The oil entering the annular space 15 also spreads out into ball bearings 5 and 16 to help lubricate same. In FIGS. 3 and 4 we have shown this space 15 to open directly into the gap 7 so that part of the entering oil also comes into contact with the rotating outer race 5' supporting the pump hub 40. Except for a small layer of oil flowing through the gap 7, however, the incoming flow passes in FIG. 3 through one or more channels 22 of stator body 80 which terminate at respective ports 23 near the roots of blades 81. In FIG. 4 an extension 25 of channel 22 passes through part of a blade 81 so as to open into space 9 at a point still farther away from pump member 6. In the latter instance, the oil flow through the gap 7 is further throttled by an overhanging bulge 24 of the stator body.

We claim:

1. In a hydraulic torque converter wherein a pump member, a turbine member and a stator member have coaxial hubs independently rotatable inside a housing and have blade-supporting peripheral walls defining a toroidal space filled with transmission fluid, said stator member and said pump member being separated from each other by a gap, the hub of said turbine member being mounted on an output shaft journaled in a trunnion of said housing, said trunnion forming an inlet for fresh fluid and an outlet for spent fluid, the hubs of said pump member and of said stator member being respectively supported on said trunnion by first and second bearing means axially spaced from each other, the improvement wherein said inlet passes inwardly of said first bearing means and terminates at a passage which extends between said first and second bearing means and communicates with at least one generally radial channel in the body of said stator member which passes through a blade of said stator member and opens into said toroidal space at a location radially outward from the hub of said pump member, said passage also communicating with said gap for letting a minor portion of the incoming fluid enter said toroidal space outside said channel.

2. A torque converter as defined in claim 1 wherein said passage is formed in a spacer ring separating said first and second bearing means from each other.

3. The torque converter defined in claims 1 or 2 wherein an extension of said outlet lies between said stator member and the hub of said turbine member.

* * * * *